(12) United States Patent
Iwata et al.

(10) Patent No.: US 8,154,893 B2
(45) Date of Patent: Apr. 10, 2012

(54) THREE-PHASE POWER CONVERTING APPARATUS

(75) Inventors: Akihiko Iwata, Tokyo (JP); Hiroshi Ito, Tokyo (JP); Hirofumi Akagi, Tokyo (JP); Hideaki Fujita, Tokyo (JP); Takushi Jimichi, Tokyo (JP)

(73) Assignees: Mitsubishi Electric Corporation, Tokyo (JP); Tokyo Institute of Technology, Tokyo (JP)

( * ) Notice: Subject to any disclaimer, the term of this patent is extended or adjusted under 35 U.S.C. 154(b) by 344 days.

(21) Appl. No.: 12/527,709

(22) PCT Filed: Feb. 20, 2008

(86) PCT No.: PCT/JP2008/000275
§ 371 (c)(1),
(2), (4) Date: Sep. 16, 2009

(87) PCT Pub. No.: WO2008/102551
PCT Pub. Date: Aug. 28, 2008

(65) Prior Publication Data
US 2010/0014335 A1 Jan. 21, 2010

(30) Foreign Application Priority Data
Feb. 22, 2007 (JP) .................. 2007-041764

(51) Int. Cl.
*H02M 7/44* (2006.01)
(52) U.S. Cl. .......................... 363/98; 363/132
(58) Field of Classification Search .................... 363/40, 363/41, 71, 98, 132
See application file for complete search history.

(56) References Cited

U.S. PATENT DOCUMENTS

| 6,137,704 A | * | 10/2000 | Ito et al. ....................... 363/132 |
| 6,611,441 B2 | * | 8/2003 | Kurokami et al. .......... 363/56.02 |
| 7,430,132 B2 | * | 9/2008 | Morishita ........................ 363/55 |
| 7,825,540 B2 | * | 11/2010 | Ogusa et al. .................... 307/58 |

FOREIGN PATENT DOCUMENTS

| JP | 62 42213 | 2/1987 |
| JP | 2000 166251 | 6/2000 |
| JP | 2001 103768 | 4/2001 |
| JP | 2003 189475 | 7/2003 |
| JP | 2004 7941 | 1/2004 |
| WO | 2008 102552 | 8/2008 |

OTHER PUBLICATIONS

U.S. Appl. No. 12/527,869, filed Aug. 20, 2009, Iwata, et al.
U.S. Appl. No. 13/127,132, filed May 2, 2011, Iwata, et al.

* cited by examiner

*Primary Examiner* — Jessica Han
(74) *Attorney, Agent, or Firm* — Oblon, Spivak, McClelland, Maier & Neustadt, L.L.P.

(57) ABSTRACT

A three-phase inverter circuit including a DC portion including capacitors connected between output terminals of a solar battery and single-phase inverters connected in series with AC output lines of the three-phase inverter circuit that together constitute an inverter section, the inverter section being connected to a three-phase power system. The three-phase inverter circuit outputs a reverse-polarity voltage pulse during a period within each of basic voltage pulses of which pulsewidth corresponds to a half cycle every half cycle of a system voltage. A power burden born by the individual single-phase inverters in each half cycle is made approximately zero and the individual single-phase inverters make a correction for subtracting a common voltage from target output voltages of individual phases during the period when the reverse-polarity voltage pulse is generated.

12 Claims, 9 Drawing Sheets

THREE-PHASE POWER CONVERTING APPARATUS

TECHNICAL FIELD

The present invention relates to a power converting apparatus for converting DC power into AC power and, more particularly, to a three-phase power converting apparatus for connecting a distributed power generation source, such as a solar battery, to a three-phase power system.

BACKGROUND ART

One conventional three-phase power converting apparatus is a below-described power converting apparatus for solar power generation which converts DC power fed from a solar battery into AC power with three-phase outputs and delivers this AC power to a three-phase power system to which the power converting apparatus is connected. This power converting apparatus includes three sets of half-bridge inverters, each including two switching devices connected in series, wherein each of the three sets of half-bridge inverters is configured to output a positive or negative voltage with a neutral point of capacitors connected to a DC input portion set at zero level and obtain a desired output waveform by performing pulse-width modulation (PWM) control operation (refer to Patent Document 1, for example).

Patent Document 1: Japanese Laid-open Patent Application No. 1987-42213

DISCLOSURE OF THE INVENTION

Problems to be Solved by the Invention

Since the three-phase power converting apparatus shown in Patent Document 1 cited above outputs striplike waveforms produced from relatively high rectangular voltages by PWM control of the half-bridge inverters, there occurs a large switching loss and a resultant reduction in efficiency of the apparatus. Also, since rectangular voltages output from the half-bridge inverters are smoothed, there is a need for a large-capacity filter, thus producing a problem that the structure of the apparatus increases in size.

The present invention has been made to overcome the aforementioned problems. Accordingly, it is an object of the invention to provide a structure of a three-phase power converting apparatus featuring a compact apparatus structure and low cost, as well as a high converting efficiency.

Means for Solving the Problems

A first three-phase power converting apparatus according to the present invention is a three-phase power converting apparatus for connecting a DC power supply to a three-phase power system. The three-phase power converting apparatus includes a smoothing capacitor connected between positive and negative terminals of the DC power supply, a three-phase inverter circuit for converting DC power fed from the smoothing capacitor into three-phase AC power, and single-phase inverters which are connected in series with AC output lines of individual phases of the three-phase inverter circuit. The three-phase inverter circuit outputs a few reverse-polarity voltage pulses or less in a specific region within each of basic voltage pulses of which pulsewidth corresponds to a half cycle of a system voltage every half cycle of the system voltage. The individual single-phase inverters output voltages by PWM control operation in such a manner as to make up for differences between phase voltages of the power system and outputs of the respective three-phase inverter circuit, and correct the outputs of the three-phase inverter circuit by subtracting a common voltage from target output voltages of the individual phases set in the PWM control operation during periods when the three-phase inverter circuit generates the reverse-polarity voltage pulses.

A second three-phase power converting apparatus according to the present invention is a three-phase power converting apparatus for connecting a DC power supply to a three-phase power system. The three-phase power converting apparatus includes a smoothing capacitor connected between positive and negative terminals of the DC power supply, a three-phase inverter circuit for converting DC power fed from the smoothing capacitor into three-phase AC power, and single-phase inverters which are connected in series with AC output lines of individual phases of the three-phase inverter circuit. The three-phase inverter circuit outputs a few reverse-polarity voltage pulses or less in a specific region within each of basic voltage pulses of which pulsewidth corresponds to a half cycle of a system voltage every half cycle of the system voltage. The individual single-phase inverters output voltages by PWM control operation in such a manner as to make up for differences between phase voltages of the power system and outputs of the respective three-phase inverter circuit. The pulsewidth of the reverse-polarity voltage pulses output by the three-phase inverter circuit is controlled so that a power burden born by the individual single-phase inverters during a half-cycle period of the power system becomes approximately zero.

Advantageous Effects of the Invention

The first three-phase power converting apparatus of the present invention does not require a high voltage for performing the PWM control operation, so that it is possible to reduce switching loss as well as the capacity of an output filter. Furthermore, even if an input DC voltage of the three-phase inverter circuit becomes high, it is possible to make an adjustment for decreasing the power burden born by the individual single-phase inverters by outputting the aforementioned reverse-polarity voltage pulses. Also, since the individual single-phase inverters correct the outputs of the three-phase inverter circuit by subtracting the common voltage from the target output voltages of the individual phases set in the PWM control operation during the periods when the three-phase inverter circuit generates the reverse-polarity voltage pulses, it is possible to reduce DC voltages required by the individual single-phase inverters. For this reason, it is possible to make the apparatus structure compact and simple and achieve a cost reduction and improved converting efficiency.

The second three-phase power converting apparatus of the present invention does not require a high voltage for performing the PWM control operation, so that it is possible to reduce switching loss as well as the capacity of an output filter. Furthermore, even if an input DC voltage of the three-phase inverter circuit becomes high, it is possible to make an adjustment for decreasing the power burden born by the individual single-phase inverters by outputting the aforementioned reverse-polarity voltage pulses. Also, since the pulsewidth of the reverse-polarity voltage pulses is controlled so that the power burden born by the individual single-phase inverters during the half-cycle period of the power system becomes approximately zero, it is not necessary to supply electric power from the exterior for feeding DC power to the individual single-phase inverters. For this reason, it is possible to make the apparatus structure compact and simple and achieve a cost reduction and improved converting efficiency.

BEST MODE FOR CARRYING OUT THE INVENTION

First Embodiment

Figure 1:
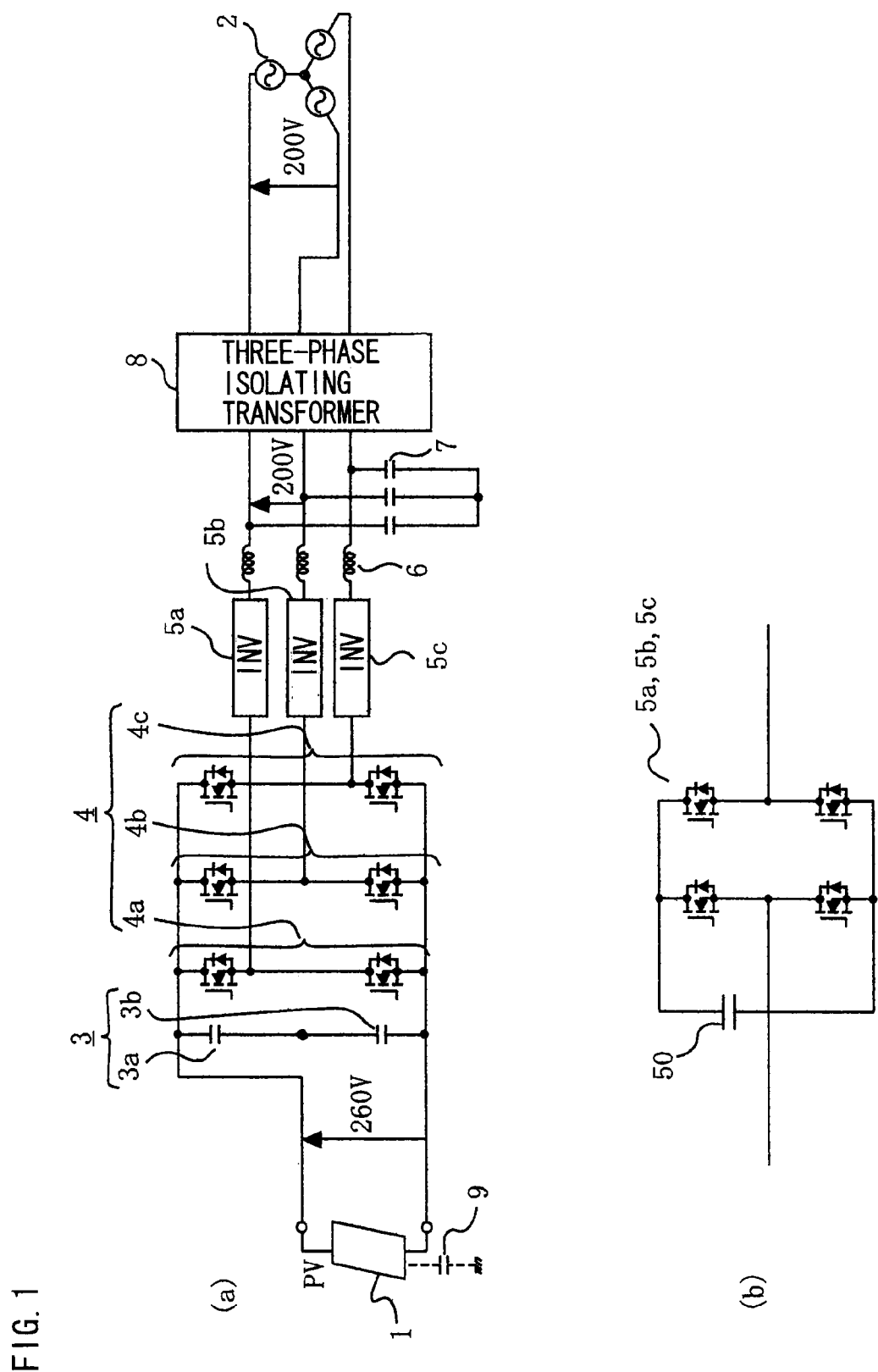
FIG. 1 is a circuit diagram showing the configuration of a three-phase power converting apparatus according to a first embodiment of the present invention.

A three-phase power converting apparatus according to a first embodiment of the present invention is described with reference to the drawings hereinbelow. FIG. 1(a) is a circuit diagram showing the configuration of the three-phase power converting apparatus according to the first embodiment of the present invention, and FIG. 1 (b) is a partially enlarged diagram of FIG. 1(a).

As shown in FIG. 1(a), the three-phase power converting apparatus converts DC power fed from a solar battery 1 serving as a DC power supply into AC power and outputs the AC power to a three-phase power system 2 (hereinafter referred to simply as the power system 2) through a three-phase isolating transformer 8. In this case, the power system 2 has a Y-connected configuration operated at a line-to-line voltage of 200 V and, thus, an input line-to-line voltage of the three-phase isolating transformer 8 must be 200 V. The three-phase power converting apparatus is provided with an inverter section including a three-phase inverter circuit 4 configured with three sets of half-bridge inverters 4a-4c, each of which is made up of two series-connected switching devices, and single-phase inverters 5a-5c which are connected in series with AC output lines of the three sets of half-bridge inverters 4a-4c, respectively.

Also, two series-connected smoothing capacitors 3 (3a, 3b) are connected between positive and negative terminals from which a voltage generated by the solar battery panel 1 is output, and the three-phase inverter circuit 4 converts DC power fed from the smoothing capacitors 3 into three-phase AC power. There is provided a filter circuit made up of reactors 6 and capacitors 7 at an output side of the single-phase inverters 5a-5c, and output terminals of the single-phase inverters 5a-5c are connected to respective phases of the three-phase isolating transformer 8 on a primary side thereof through the filter circuit. Designated by 9 is stray capacitance between the solar battery panel 1 and a ground.

Each of the single-phase inverters 5a-5c is configured with a full-bridge inverter made up of four switching devices and provided with a capacitor 50 for retaining a voltage on a DC input side as shown in FIG. 1 (b). Output voltages of the single-phase inverters 5a-5c of the individual phases are added to output voltages of the half-bridge inverters 4a-4c of the relevant phases, and a total voltage of the output voltage of each of the half-bridge inverters 4a-4c and the output voltage of the corresponding one of the single-phase inverters 5a-5c is output from the inverter section. Incidentally, the voltage of the capacitor 50 of each of the single-phase inverters 5a-5c is made lower than a voltage of a DC portion of the half-bridge inverters 4a-4c, that is, the output voltage of the solar battery 1.

The working of the inverter section including the half-bridge inverters 4a-4c and the single-phase inverters 5a-5c is described in the following.

Figure 2:
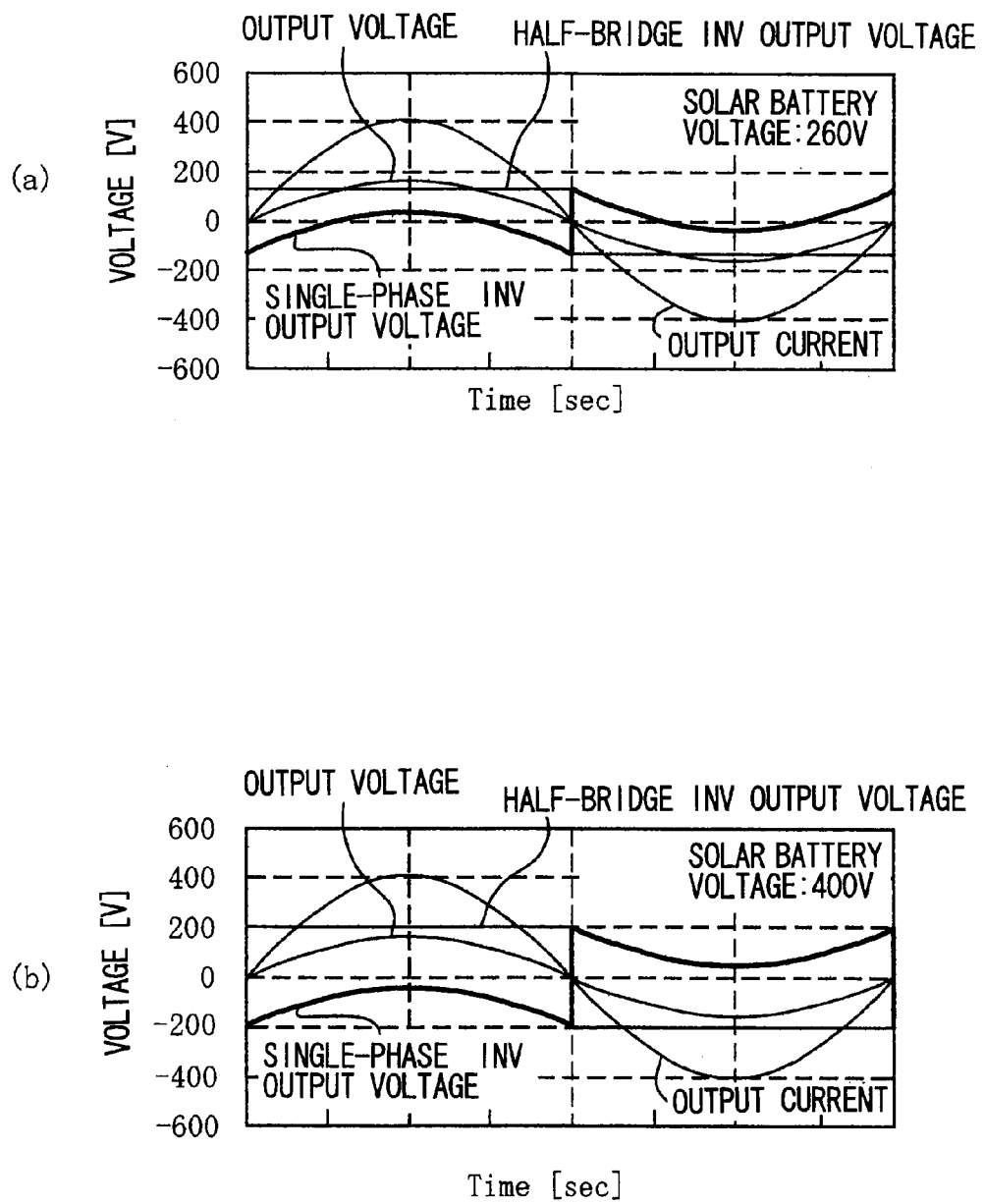
FIG. 2 is a diagram showing voltage waveforms for explaining basic control operation of an inverter section according to the first embodiment of the present invention.

First, basic control operation of the inverter section is explained based on operating voltage waveforms of FIG. 2. Each of the half-bridge inverters 4a-4c of the three-phase inverter circuit 4 outputs voltages of both polarities using a middle point of the smoothing capacitors 3 as a zero potential reference at intervals of 1 pulse per half cycle. Voltage pulses of both polarities output at intervals of this pulsewidth corresponding to a half cycle are referred to as basic voltage pulses. Since the line-to-line voltage of the power system 2 is 200 V and the input line-to-line voltage of the three-phase isolating transformer 8 must be 200 V, each phase voltage output from the inverter section equals a voltage of $200/\sqrt{3}$ V. It follows that the single-phase inverters 5a-5c output voltages by high-frequency PWM control in such a manner as to make up for differences between the phase voltages and the output voltages of the respective half-bridge inverters 4a-4c.

Under conditions where the voltage of the solar battery 1 is 260 V, each of the half-bridge inverters 4a-4c of the three-phase inverter circuit 4 outputs basic voltage pulses of ±130 V at half-cycle intervals using the middle point of the smoothing capacitors 3 as the zero potential reference as shown in FIG. 2 (a). During a half cycle, each of the single-phase inverters 5a-5c generates a voltage of a polarity opposite to the output voltage of the inverter section in regions where the phase is close to 0 degrees and 180 degrees, whereas each of the single-phase inverters 5a-5c outputs a voltage of the same polarity as the output voltage of the inverter section in a region where the phase is close to 90 degrees. In the case of control operation (operation at a power factor of 1) in which the phase or an output current is matched with the phase of the output voltage, each of the single-phase inverters 5a-5c is operated to charge the capacitor 50 in the regions where the phase is close to 0 degrees and 180 degrees and, on the contrary, each of the single-phase inverters 5a-5c discharges the capacitor 50 in the region where the phase is close to 90 degrees. If the DC voltage of the half-bridge inverters 4a-4c (i.e. the voltage of the solar battery 1) is 260 V, effects of charging and discharging during the half cycle are canceled out each other, so that the voltage of each capacitor 50 remains unchanged. This means that the amounts of electric power supplied to and demanded by the single-phase inverters 5a-5c (power burden) become approximately zero and, thus, the amounts of supply and demand of electric power are balanced.

FIG. 2 (b) shows a condition in which the voltage of the solar battery 1 has increased and reached 400 V. In this condition, each of the half-bridge inverters 4a-4c of the three-phase inverter circuit 4 outputs basic voltage pulses of ±200 V at the half-cycle intervals using the middle point of the smoothing capacitors 3 as the zero potential reference. In this case, each of the single-phase inverters 5a-5c generates a voltage of a polarity opposite to the output voltage of the inverter section throughout each half cycle. In the case of operation at the power factor of 1, each of the single-phase inverters 5a-5c is operated to always charge the capacitor 50.

Figure 3:
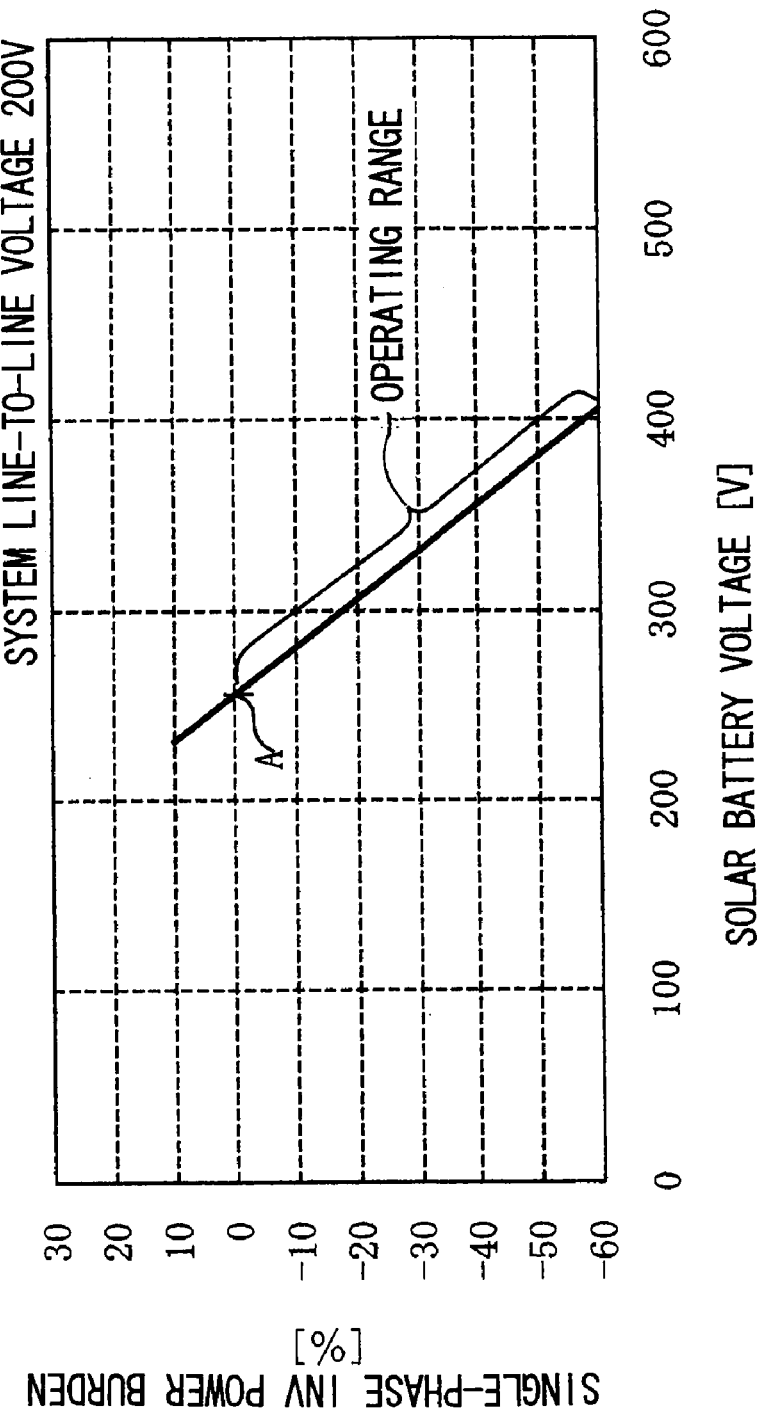
FIG. 3 is a diagram showing a relationship between voltage of a solar battery and a power burden born by single-phase inverters in the basic control operation of the inverter section according to the first embodiment of the present invention.

If an attempt is made to perform the basic control operation in which the basic voltage pulses of both polarities output from the three-phase inverter circuit 4 at the half-cycle intervals are combined with the output voltages of the single-phase inverters 5a-5c obtained by high-frequency PWM control in the aforementioned manner even when the voltage of the solar battery 1 varies, a power burden born by the single-phase inverters 5a-5c per half cycle varies with the voltage of the solar battery 1 according to a characteristic shown in FIG. 3. As shown in this Figure, although the power burden of the single-phase inverters 5a-5c is approximately zero when the voltage of the solar battery 1 is 260 V (point A in the Figure), the power burden goes negative when the voltage of the solar battery 1 increases. The voltage of the solar battery 1 could easily vary up to about twice as high. When the voltage of the solar battery 1 is 400 V, the power burden of the single-phase inverters 5a-5c can reach even −60% of electric power handled by the three-phase inverter circuit 4, so that it becomes necessary that the capacitors 50 of the single-phase inverters 5a-5c be provided with a large-sized, complicated DC power supply circuit for supplying electric power.

In the aforementioned basic control operation of the present embodiment, the inverter section is controlled in such a manner that, regarding a region where the power burden of the single-phase inverters 5a-5c is equal to or less than zero (refer to FIG. 3) as an operating range of the three-phase power converting apparatus, the power burden of the single-phase inverters 5a-5c becomes approximately zero.

Here, two steps of adjustments are made in the aforementioned basic control operation. A first adjustment causes the three-phase inverter circuit 4 to output voltage pulses of reverse polarities approximately at a point of each maximum value of a current within the aforementioned basic voltage pulse which is output every half cycle. Details of this first adjustment will be described later with reference to FIG. 4. A second adjustment is to make corrections to outputs of the single-phase inverters 5a-5c. Details of this second adjustment will be described later with reference to FIGS. 5-7.

The first adjustment performed in the control operation of the inverter section is described hereunder.

Figure 4:
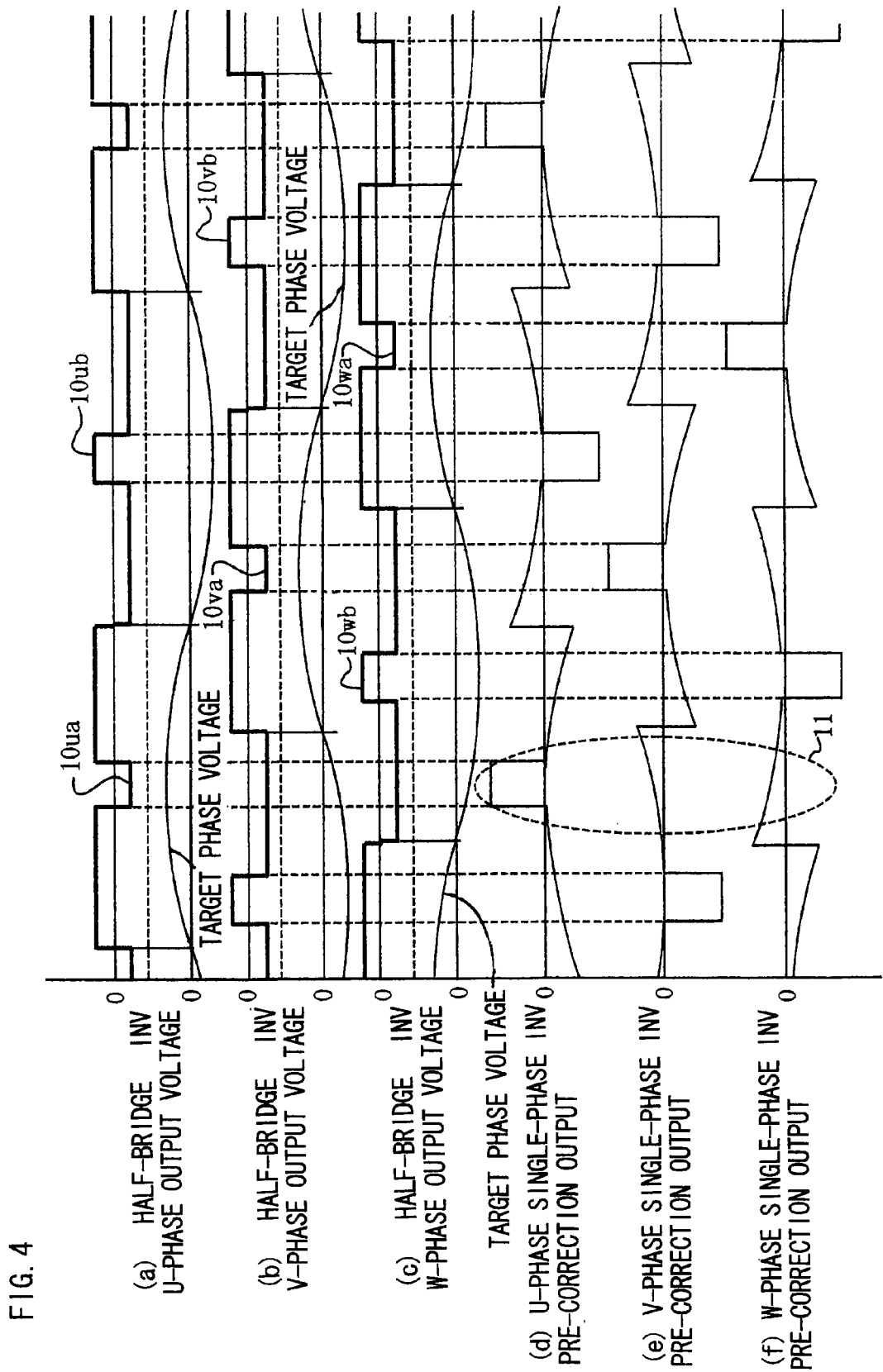
FIG. 4 is a diagram showing voltage waveforms for explaining a first adjustment performed in the control operation of the inverter section according to the first embodiment of the present invention.

FIG. 4 shows output voltage waveforms of the individual half-bridge inverters 4a-4c of the three-phase inverter circuit 4 and the individual single-phase inverters 5a-5c. Here, the outputs of the single-phase inverters 5a-5c of the individual phases indicate outputs at a stage before making the later-described output correction of the second adjustment, or the pre-correction outputs. As shown in the Figure, the half-bridge inverters 4a-4c of the individual phases output voltage pulses of reverse polarities approximately at the point of the maximum value of each current within the basic voltage pulse which is output every half cycle. Designated by 10ua and 10ub are reverse-polarity voltage pulses output from the U-phase half-bridge inverter 4a during the positive and negative basic voltage pulses, respectively. Similarly, designated by 10va and 10vb are reverse-polarity voltage pulses output from the V-phase half-bridge inverter 4b during the positive and negative basic voltage pulses, respectively, and designated by 10wa and 10wb are reverse-polarity voltage pulses output from the W-phase half-bridge inverter 4c during the positive and negative basic voltage pulses, respectively. Provided that each current flowing in the inverter section have the same phase as the corresponding phase voltage, the reverse-polarity voltage pulses 10ua, 10ub, 10va, 10vb, 10wa, 10wb are output at around peaks of the individual phase voltages.

The single-phase inverters 5a-5c of the individual phases serve to output the voltages by high-frequency PWM control in such a manner as to make up for differences between target phase voltages of the inverter section and the output voltages of the respective half-bridge inverters 4a-4c. Thus, the single-phase inverters 5a-5c of the individual phases output prominent pulse voltages during periods when the half-bridge inverters 4a-4c of the respective phases output the reverse-polarity voltage pulses 10ua, 10ub, 10va, 10vb, 10wa, 10wb. By these prominent pulse voltages, the single-phase inverters 5a-5c can discharge the respective capacitors 50 and adjust the power burden.

For example, during a half cycle in which the U-phase half-bridge inverter 4a outputs the positive basic voltage pulse, the U-phase single-phase inverter 5a outputs a positive voltage which is the aforementioned prominent pulse voltage within the period when the U-phase half-bridge inverter 4a generates the reverse-polarity voltage pulse 10ua, and the U-phase half-bridge inverter 4a outputs a negative voltage in other than this period. This means that it is possible to adjust the amounts of electric power supplied to and demanded by the single-phase inverter 5a by controlling the pulsewidth of the reverse-polarity voltage pulse 10ua.

Here, the pulsewidths of the reverse-polarity voltage pulses 10ua, 10ub, 10va, 10vb, 10wa, 10wb are controlled in such a manner that the amounts of electric power charged into and discharged from the capacitors 50 are balanced and the power burden of the single-phase inverters 5a-5c becomes approximately zero. This makes it possible to maintain the voltages of the capacitors 50 without supplying electric power from the exterior. One specific approach to this control operation is, under conditions where phase currents and phase voltages are of the same phases, to suppress a reduction in the voltages of the capacitors 50 when decreasing the pulsewidths of the reverse-polarity voltage pulses 10ua, 10ub, 10va, 10vb, 10wa, 10wb and to suppress an increase in the voltages of the capacitors 50 when increasing the pulsewidths of the reverse-polarity voltage pulses 10ua, 10ub, 10va, 10vb, 10wa, 10wb. Since the reverse-polarity voltage pulses 10ua, 10ub, 10va, 10vb, 10wa, 10wb are generated approximately at points of maximum values of the respective phase currents, the amount of change in the power burden of the single-phase inverters 5a-5c is increased by varying the aforementioned pulsewidths so that the power burden can be controlled in a desirable fashion.

In a case where the power burden of the single-phase inverters 5a-5c is approximately zero in the basic control operation shown in FIG. 2, the reverse-polarity voltage pulses are not necessary, that is, the pulsewidths thereof may be 0, when the voltage of the solar battery 1 is 260 V, for example.

Next, the second adjustment performed in the control operation of the inverter section is described hereunder.

As discussed in the foregoing, the single-phase inverters 5a-5c of the individual phases output the prominent pulse voltages during the periods when the half-bridge inverters 4a-4c of the respective phases generate the reverse-polarity voltage pulses 10ua, 10ub, 10va, 10vb, 10wa, 10wb in the aforementioned first adjustment. The second adjustment is an output correction performed for reducing voltage levels of these prominent pulse voltages, in which the individual single-phase inverters 5a-5c correct the voltage levels of the prominent pulse voltages by subtracting a common voltage from target output voltages of the individual phases in PWM control during the periods when the reverse-polarity voltage pulses 10ua, 10ub, 10va, 10vb, 10wa, 10wb are generated.

Figure 5:
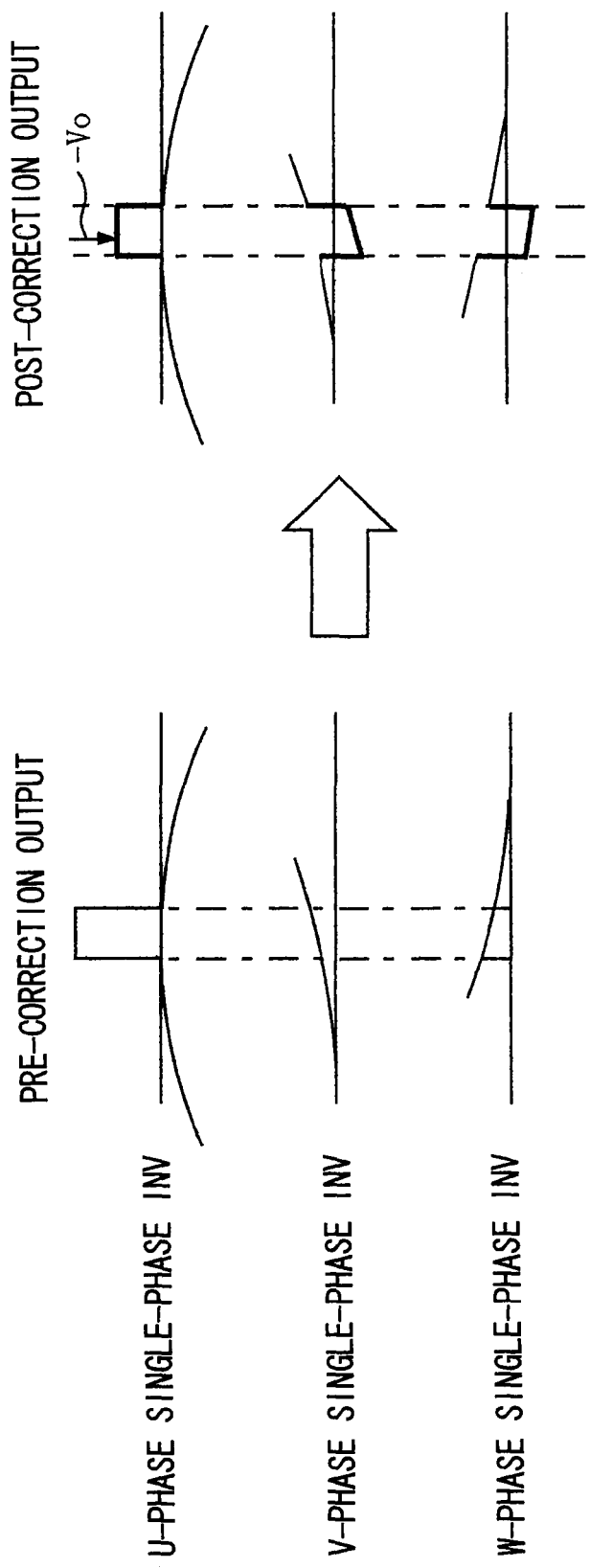
FIG. 5 is a diagram showing voltage waveforms for explaining a second adjustment performed in the control operation of the inverter section according to the first embodiment of the present invention.

Shown in FIG. 5 is how the outputs of the individual single-phase inverters 5a-5c are corrected during the period when the U-phase reverse-polarity voltage pulse 10ua is generated. Pre-correction outputs in this case are shown in an area designated by 11 in FIG. 4. When the voltage of the solar battery 1 is 400 V and the line-to-line voltage of the power system 2 is 200 V, the phase voltage that should be output by the inverter section is 200/√3 V and a maximum value of the phase voltage becomes equal to 163 V. Since the U-phase half-bridge inverter 4a outputs −200 V during the period when the U-phase reverse-polarity voltage pulse 10ua is generated, the voltage that should be output by the U-phase single-phase inverter 5a was 363 V in a pre-correction stage. The output voltage of the U-phase single-phase inverter 5a can be greatly reduced during the period when the reverse-polarity voltage pulse 10ua is generated by making a correction for subtracting a specific voltage from the outputs of the single-phase inverters 5a-5c of the individual phases as shown in FIG. 5. In this case, the output voltages of the V- and W-phase single-phase inverters 5b, 5c change in polarity from positive to negative. The aforementioned output correction is made by subtracting a specific common voltage Vo from the target output voltages of the single-phase inverters 5a-5c of the individual phases in order to suppress the levels of the output voltages of the single-phase inverters 5a-5c of the individual phases during the period when the reverse-polarity voltage pulse 10ua is generated.

Since the same common voltage Vo is subtracted from the individual target output voltages of the single-phase inverters 5a-5c of the three phases, the line-to-line voltage output from the inverter section is kept at a specific value (200 V) and, thus, the line-to-line voltage supplied to the power system 2 is also kept at the specific value. Although the potential at a neutral point of the three-phase AC outputs of the inverter section fluctuates in this case, this fluctuation does not exert any adverse influence on the power system 2 because the outputs of the inverter section are supplied to the power system 2 through the three-phase isolating transformer 8.

The common voltage Vo to be subtracted from the target output voltages of the single-phase inverters 5a-5c of the individual phases is obtained as follows, for example.

The common voltage Vo is determined by calculating an average voltage of maximum and minimum voltages of three pre-correction target output voltages of the individual single-phase inverters 5a-5c during the period when the reverse-polarity voltage pulse 10ua is generated. For example, if the pre-correction target output voltage of the U-phase single-phase inverter 5a is 350 V, the pre-correction target output voltage of the V-phase single-phase inverter 5b is 100 V and the pre-correction target output voltage of the W-phase single-phase inverter 5c is 150 V, the common voltage Vo is calculated as common voltage Vo=225 V, and a post-correction target output voltage of the U-phase single-phase inverter 5a becomes equal to 125 V, a post-correction target output voltage of the V-phase single-phase inverter 5b becomes equal to −125 V and a post-correction target output voltage of the -phase single-phase inverter 5c becomes equal to −75 V. As a consequence, it becomes possible to effectively suppress the levels of the output voltages of the individual single-phase inverters 5a-5c and reduce DC voltages required by the individual single-phase inverters 5a-5c.

Figure 6:
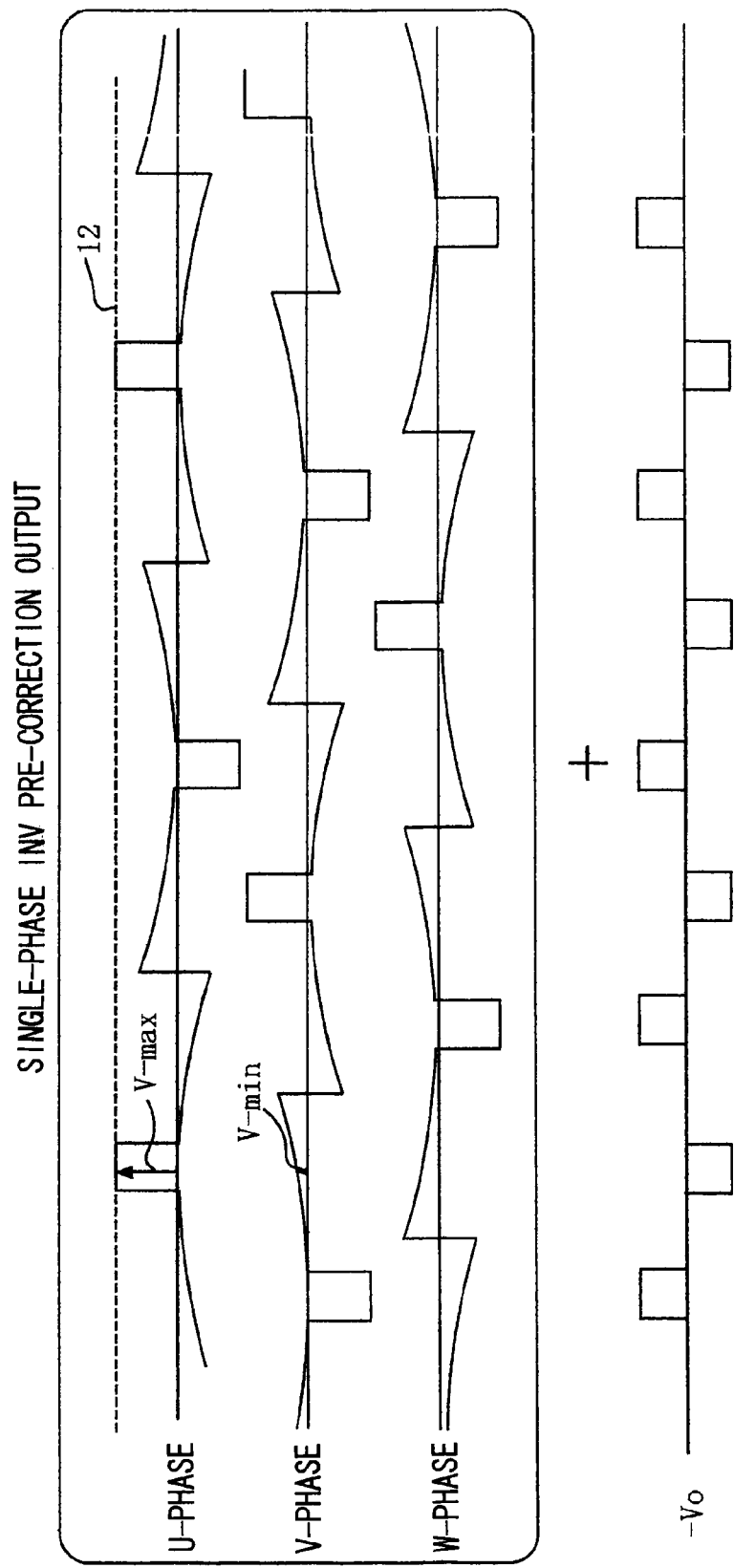
FIG. 6 is a diagram showing voltage waveforms for explaining the second adjustment performed in the control operation of the inverter section according to the first embodiment of the present invention.
Figure 7:
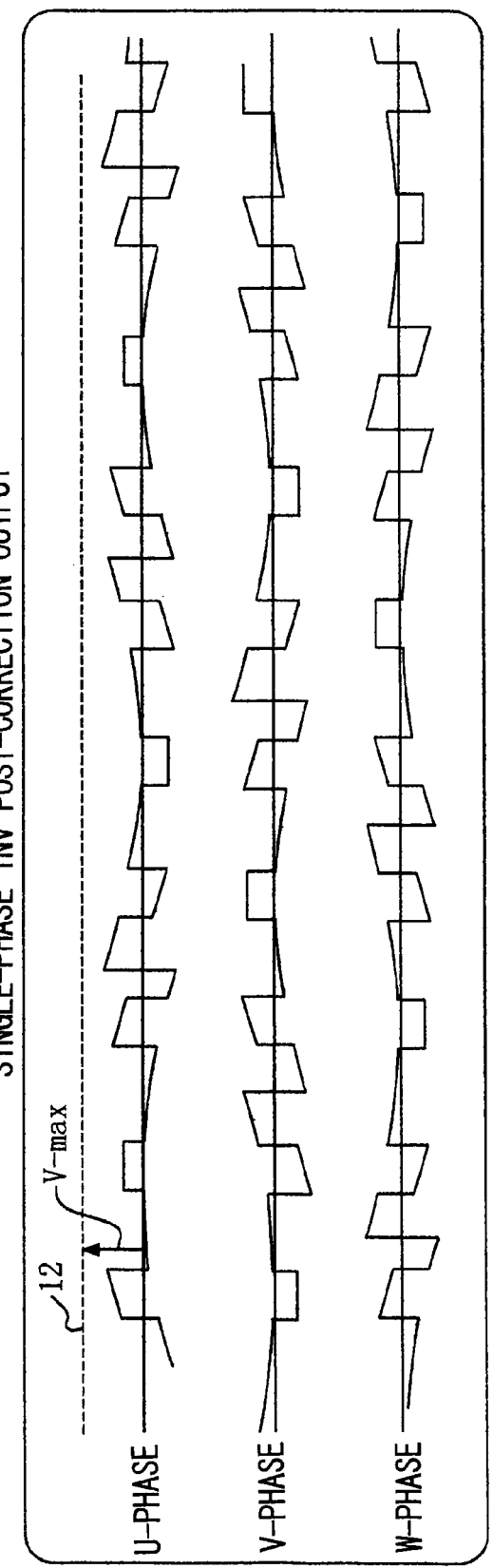
FIG. 7 is a diagram showing voltage waveforms for explaining the second adjustment performed in the control operation of the inverter section according to the first embodiment of the present invention.

FIGS. 6 and 7 are voltage waveforms for explaining how the outputs of the individual single-phase inverters 5a-5c are corrected. It is understood that the common voltage Vo is pulse outputs having a repetitive period equal to one-third the period of a fundamental frequency as shown in FIG. 6. In this case, the common voltage Vo is the average voltage of the maximum voltage V-max and the minimum voltage V-min of the outputs of the single-phase inverters 5a-5c during the period when the reverse-polarity voltage pulse 10ua is generated. It is understood that the outputs of the individual single-phase inverters 5a-5c are significantly reduced from a voltage level 12 of the original maximum voltage V-max after correction as shown in FIG. 7.

Incidentally, since the common voltage Vo does not contain any fundamental frequency components, no change occurs in the power burden of the individual single-phase inverters 5a-5c as a result of subtraction of the common voltage Vo if the phase currents have only the fundamental frequency.

In this embodiment, the three-phase inverter circuit 4 outputs one reverse-polarity voltage pulse in each basic voltage pulse of which pulsewidth corresponds to a half cycle of the basic voltage pulse every half cycle of a system voltage and the individual single-phase inverters 5a-5c add the voltages output by PWM control to the outputs of the three-phase inverter circuit 4 upon making the correction for suppressing the output voltages as thus far discussed. For this reason, it is not necessary to perform PWM control operation by using high voltages and, thus, it is possible to reduce switching loss as well as the capacity of an output filter.

Figure 8:
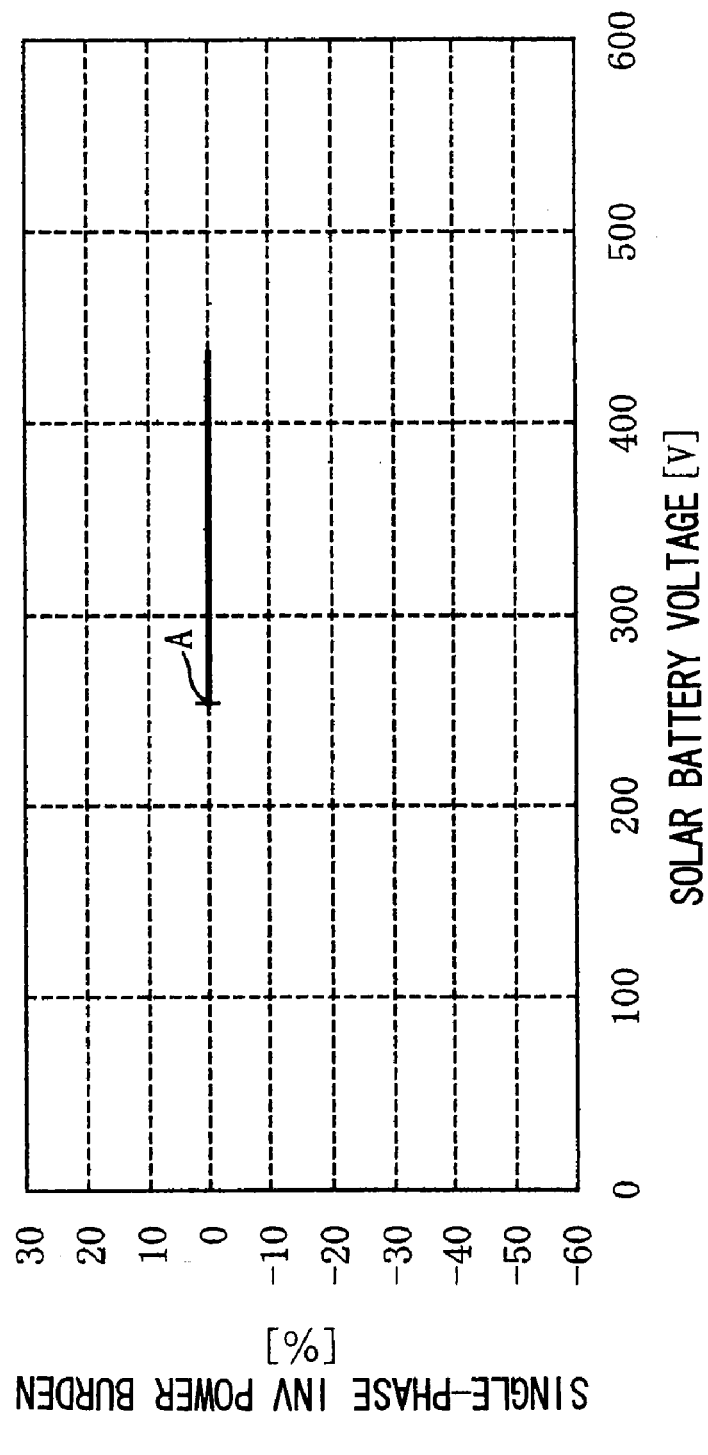
FIG. 8 is a diagram showing a relationship between the voltage of the solar battery and the power burden born by the single-phase inverters according to the first embodiment of the present invention.
Figure 9:
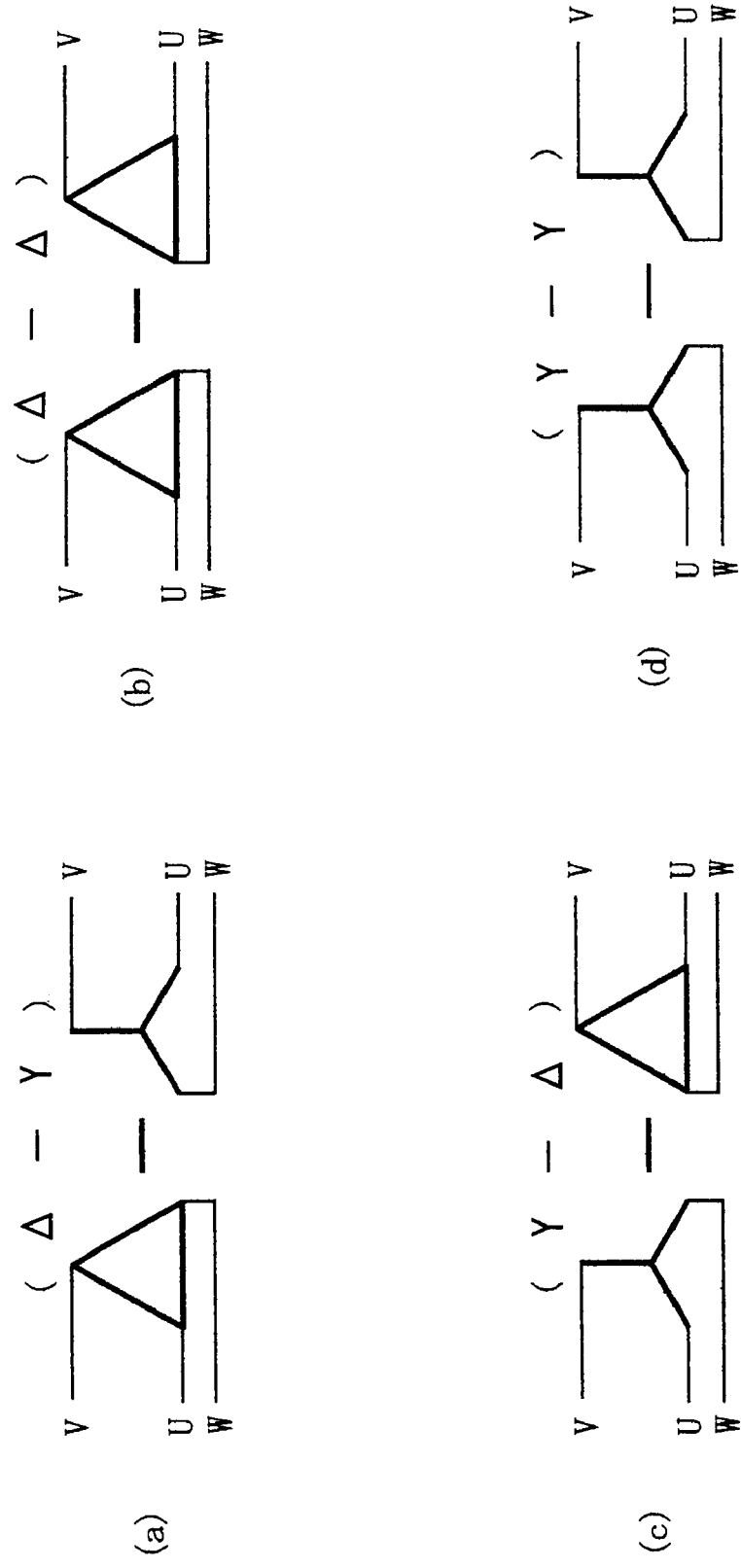
FIG. 9 is a diagram showing configurations of connection of a three-phase isolating transformer of the three-phase power converting apparatus according to the first embodiment of the present invention.

Also, it is possible to make the power burden of the single-phase inverters 5a-5c approximately zero and, thus, to balance the amounts of supply and demand of electric power by adjusting the amounts of electric power supplied to and demanded by the individual single-phase inverters 5a-5c while preventing the output voltages of the individual single-phase inverters 5a-5c from increasing. FIG. 8 shows the power burden born by the single-phase inverters 5a-5c during a half-cycle period in relation to the voltage of the solar battery 1, from which it can be seen that the power burden is held at zero level over a wide voltage range. For this reason, a DC portion of the single-phase inverters 5a-5c need not exchange electric power to and from the exterior and the maximum voltage to be output by the single-phase inverters 5a-5c can be significantly reduced, so that the DC voltages required by the individual single-phase inverters 5a-5c can be reduced.

It is therefore possible to make the apparatus structure compact and simple and achieve a cost reduction and improved converting efficiency.

It is to be noted that the method of determining the common voltage Vo is not limited to the aforementioned example. An alternative method is described in the following.

A voltage that should be subtracted from a maximum one of three pre-correction target output voltages of the individual single-phase inverters 5a-5c during the period when the reverse-polarity voltage pulse is generated so that the maximum voltage falls within a predefined permissible voltage range is determined and the voltage thus determined is set as the common voltage Vo. For example, it is assumed that the voltage that the single-phase inverters 5a-5c can output is 150 V, the pre-correction target output voltage of the U-phase single-phase inverter 5a is 350 V, the pre-correction target output voltage of the V-phase single-phase inverter 5b is 100 V and the pre-correction target output voltage of the W-phase single-phase inverter 5c is 150 V. To reduce the pre-correction target output voltage 350 V of the U-phase single-phase inverter 5a which is the maximum voltage, the common voltage Vo is set as common voltage Vo=200 V. Consequently, a post-correction target output voltage of the U-phase single-phase inverter 5a becomes equal to 150 V, a post-correction target output voltage of the V-phase single-phase inverter 5b becomes equal to −100 V and a post-correction target output voltage of the W-phase single-phase inverter 5c becomes equal to −50 V. As a consequence, it becomes possible to suppress the levels of the output voltages of the individual single-phase inverters 5a-5c so that the levels of the output voltages fall within the permissible voltage range in a reliable fashion, and thereby reduce DC voltages required for the individual single-phase inverters 5a-5c.

Also, while the reverse-polarity voltage pulses 10ua, 10ub, 10va, 10vb, 10wa, 10wb of the individual phases are each generated once approximately at the point of the maximum value of each phase current in the above-described embodiment, it is possible to generate a plurality of reverse-polarity voltage pulses every half cycle, such as once every quarter half cycle. The number of reverse-polarity voltage pulses should preferably be as small as possible and is set to a few pulses or less, because deterioration in accuracy of waveform tends to occur due to an increase in switching loss or the occurrence of harmonics if the number of reverse-polarity voltage pulses increases.

Also, while the pulsewidths of the reverse-polarity voltage pulses 10ua, 10ub, 10va, 10vb, 10wa, 10wb are controlled such that the power burden of the individual single-phase inverters 5a-5c becomes approximately zero in the above-described embodiment, it is possible to allow the power burden of the individual single-phase inverters 5a-5c to fall within a specific range. In this case, the voltages of the capacitors 50 are maintained by allowing an exchange of electric power between the capacitors 50 of the individual single-phase inverters 5a-5c and an external DC power supply through a bidirectional DC/DC converter. The external DC power supply may be the smoothing capacitors 3 which constitute the DC portion of the three-phase inverter circuit 4.

Also, while the above-described embodiment is configured to perform the second adjustment for correcting the target output voltages of the individual single-phase inverters 5a-5c, it is possible to perform the control operation without making the second adjustment. Although it is impossible to reduce the DC voltages required for the individual single-phase inverters 5a-5c in this case, it is possible to make the power burden approximately zero by adjusting the amounts of electric power supplied to and demanded by the individual single-phase inverters 5a-5c by the first adjustment for generating the reverse-polarity voltage pulses 10ua, 10ub, 10va, 10vb, 10wa, 10wb.

Additionally, the three-phase isolating transformer 8 for connecting the three-phase AC power of the inverter section of the above-described embodiment to the power system 2 may be connected in any one of configurations shown in FIGS. 9(a) to 9(d). In particular, if the primary side is connected in a delta configuration, voltages generated by secondary-side windings would contain less harmonics and exhibit desirable waveform accuracy.

INDUSTRIAL APPLICABILITY

The invention can be applied to a system interconnection apparatus like a power conditioner for connecting a distributed power generation source to a three-phase power system.

The invention claimed is:

1. A three-phase power converting apparatus for connecting a DC power supply to a three-phase power system, said three-phase power converting apparatus comprising:
   a smoothing capacitor connected between positive and negative terminals of the DC power supply;
   a three-phase inverter circuit for converting DC power fed from said smoothing capacitor into three-phase AC power; and
   single-phase inverters which are connected in series with AC output lines of individual phases of said three-phase inverter circuit;
   said three-phase power converting apparatus being characterized in that said three-phase inverter circuit outputs a few reverse-polarity voltage pulses or less in a specific region within each of basic voltage pulses of which a pulse frequency corresponds to that of a system voltage, and
   said individual single-phase inverters output voltages by PWM control operation in such a manner as to make up for differences between phase voltages of the power system and outputs of said respective three-phase inverter circuit, and correct the outputs of said three-phase inverter circuit by subtracting a common voltage from target output voltages of the individual phases set in the PWM control operation during periods when said three-phase inverter circuit generates the reverse-polarity voltage pulses.

2. The three-phase power converting apparatus as recited in claim 1 wherein a three-phase isolating transformer is provided between said single-phase inverters for three phases and the three-phase power system.

3. The three-phase power converting apparatus as recited in claim 2 wherein a primary side of said three-phase isolating transformer is connected in a delta configuration.

4. The three-phase power converting apparatus as recited in claim 1 wherein the pulsewidth of the reverse-polarity voltage pulses output by said three-phase inverter circuit is controlled so that a power burden borne by said individual single-phase inverters during a half-cycle period of the power system becomes approximately zero.

5. The three-phase power converting apparatus as recited in claim 1 wherein the reverse-polarity voltage pulses output by said three-phase inverter circuit are generated at a rate of 1 pulse per half cycle of the power system approximately at a point of a maximum value of each phase current.

6. The three-phase power converting apparatus as recited in claim 5 wherein an entire waveform of the common voltage subtracted during the periods when the reverse-polarity voltage pulses are generated is a pulse output waveform having a repetitive period equal to one-third an alternating cycle of the power system.

7. The three-phase power converting apparatus as recited in claim 1 wherein the common voltage subtracted during the periods when the reverse-polarity voltage pulses are generated is set at an average value of maximum and minimum values of the target output voltages of said individual single-phase inverters in the relevant periods.

8. The three-phase power converting apparatus as recited in claim 1 wherein the common voltage subtracted during the periods when the reverse-polarity voltage pulses are generated is determined such that a maximum one of the target output voltages of said individual single-phase inverters in the relevant periods falls within a specific permissible range.

9. The three-phase power converting apparatus as recited in claim 1 wherein said DC power supply is a solar battery.

10. A three-phase power converting apparatus for connecting a DC power supply to a three-phase power system, said three-phase power converting apparatus comprising:
   a smoothing capacitor connected between positive and negative terminals of the DC power supply;
   a three-phase inverter circuit for converting DC power fed from said smoothing capacitor into three-phase AC power; and
   single-phase inverters which are connected in series with AC output lines of individual phases of said three-phase inverter circuit;
   said three-phase power converting apparatus being characterized in that said three-phase inverter circuit outputs a few reverse-polarity voltage pulses or less in a specific region within each of basic voltage pulses of which a pulse frequency corresponds to that of a system voltage, said individual single-phase inverters output voltages by PWM control operation in such a manner as to make up for differences between phase voltages of the power system and outputs of said respective three-phase inverter circuit, and
   the pulsewidth of the reverse-polarity voltage pulses output by said three-phase inverter circuit is controlled so that a power burden borne by said individual single-phase inverters during a half-cycle period of the power system becomes approximately zero.

11. The three-phase power converting apparatus as recited in claim 10 wherein the reverse-polarity voltage pulses output by said three-phase inverter circuit are generated at a rate of 1 pulse per half cycle of the power system approximately at a point of a maximum value of each phase current.

12. The three-phase power converting apparatus as recited in claim 10 wherein said DC power supply is a solar battery.

* * * * *